Figure 1:
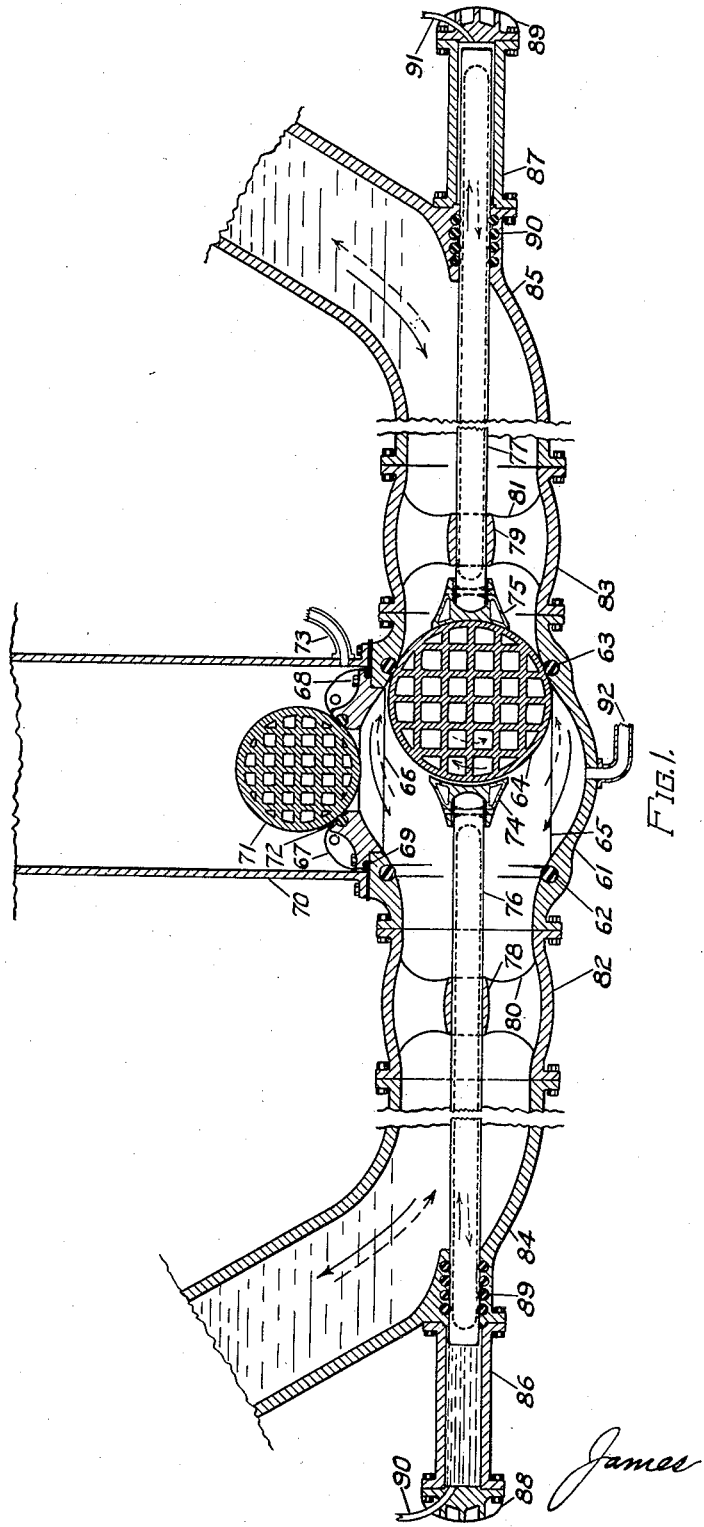

Sept. 24, 1935.    J. L. ADAMS, JR    2,015,055
CONTROL VALVE
Original Filed Dec. 8, 1933    2 Sheets-Sheet 1

INVENTOR
James L. Adams Jr.

Sept. 24, 1935.  J. L. ADAMS, JR  2,015,055
CONTROL VALVE
Original Filed Dec. 8, 1933  2 Sheets-Sheet 2

INVENTOR
James L. Adams Jr.

Patented Sept. 24, 1935

2,015,055

UNITED STATES PATENT OFFICE 2,015,055

CONTROL VALVE

James L. Adams, Jr., Youngstown, Ohio

Original application December 8, 1933, Serial No. 701,456. Divided and this application September 6, 1934, Serial No. 742,945

10 Claims. (Cl. 137—139)

This invention relates to fluid control valves, and particularly to those of the substantially stream-line flow, and floating-balance type, adaptable to production in ultra-large sizes, for use to control the very large volumes of waterflow incident to the operation of my oscillation type hydraulic locks, of high-lift form, as shown and described in my co-pending application on Canal locks, Serial #700,650, filed December 2nd, 1933, although the valves of my present invention are not necessarily limited to such use, or even to the control of water only as a working fluid. Valves somewhat related to those of my present invention, have been shown in my co-pending application on Stream-line flow valves, Serial #701,456, filed December 8th, 1933, of which this is a divisional application.

One object of the present invention is to provide a form of valve which is of the utmost sturdiness, and certainty of operation, and which at the same time will be relatively easy to construct in enormous sizes, as required for above use.

Another object is to provide a design of valve which will be readily made and kept water-tight at the valve-seats, and at the same time provide an exceedingly long life in all its working elements, with elimination of galling of metal parts.

A further object which is of importance, is to provide moving elements which are substantially floated, but yet with sufficient un-balance of weight to provide for rolling such elements into and out of contact with the respective seats, so that they will eventually shift and present the entire surface of the ball-valve consecutively to said seats, again promoting great length of life in the valve, and aiding in maintaining water-tightness, by the uniformity of wear so produced.

A valued object is to produce a type of valve in which even when the flow has been reversed, the reversed head will always tend to keep the valve closed, and seal it tight by the applied pressure, independent of the valve-shifting mechanism, or the possible failure of the latter to function, as due to loss of working pressure in supply thereto, or other cause, which might endanger lock operation.

An added object of material value is to provide a valve which at its full open position gives a very close approach to full stream-line flow conditions, along a very nearly straight-line path, with very easy hydraulic bends only, and of substantially constant cross-section throughout, so as to make for very low loss of head, which is materially aided by the fact that the moving liquid passes through one very large opening only, rather than a multiplicity of small ones, which would present a far greater total contact area to the moving liquid, and therefore give a much higher total friction value.

A vital object is to provide contacting valve elements which are so positioned as to tend to keep themselves clean of all entering sand, and other abrasive materials.

A further object is to provide easily replaced non-metallic, elastic gasket elements at the active valving positions, to make the water-seal.

Yet an additional object is to provide a convenient form of emergency relief from any possible water-hammer, which relief will operate independent of the direction of flow momentarily present in the valve, and will reset itself automatically again after functioning, without material delay and consequent loss of water therethrough.

A supplementary object is to provide a valve operating mechanism which will function fairly rapidly, but without possibility of material chattering of the connected elements during such functioning, as the hydraulic cylinders furnish their own inherent damping.

Another object is to show one form of valve which may be operated under substantial hydrostatic balance, so that it is easily opened as well as closed.

Yet other objects of importance will be self-evident to anyone skilled in the art.

With all these, and still other objects in mind, I have shown a preferred, and one alternative embodiment of my invention, which for the first time combine all the above valued features in a single practical mechanism, but which are in each case to be taken as simply illustrative of my invention, and not as limiting the same, or the scope of my broader claims.

In the drawings, Figure 1 is a vertical axial cross section of a ball-type of valve, with hydraulic operating means, and showing a heavy self-closing ball-type water-hammer relief mechanism applied thereto.

Figure 2:
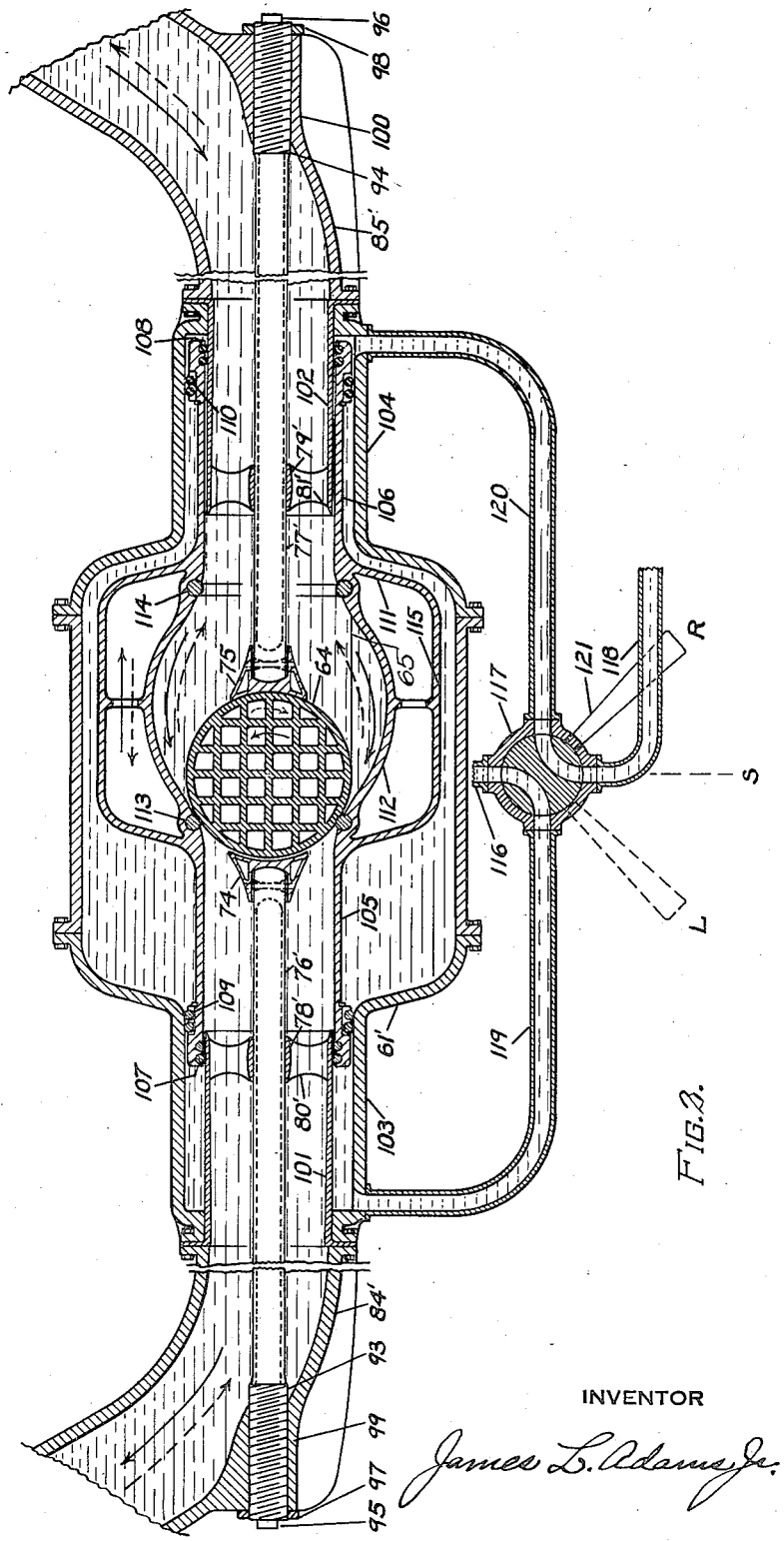

Figure 2 shows a modification of the valve of Figure 1, also in vertical and axial section, in which the ball-valve element remains substantially in situ during operation of the valve, except for a moderate amount of free rotation thereof.

In both figures identical parts are indicated by the same part numbers, and motions just completed, by solid direction arrows; that movement which is next to follow being indicated by broken line arrows. Primes indicate similar parts.

Hydraulic means of valve operation has been illustrated, but mechanical means substantially identical with that shown and described in connection with my said co-pending valve application, may be substituted if desired, and operated about as indicated by the wiring diagram associated therewith, the connecting rod shown being attached to the end of plunger in the present case, to function one of the same, or to any convenient portions of the moving elements, as evident to anyone skilled in such devices.

Referring now more particularly to Figure 1, which shows my preferred construction as between the two types illustrated, there is found a more or less globular valve-shell 61, which may be subdivided longitudinally into a plurality of sections, bolted together as required, if such subdivision is preferred, but is here shown as in one integral piece, and which is peripherally grooved on its interior for the longitudinally spaced solid-rubber or equivalent gaskets 62, 63, of generally circular shape, and of which a plurality would ordinarily be provided at each end-of-throw position, but shown as one in order to not complicate the drawings, these being contacted with by the large ball-valve element 64, preferably surfaced with a finished stainless-steel layer, and with a honey-comb cross-ribbing on interior for purposes of rigidity, but made with sufficient total empty space to give nearly a floating-balance in the surrounding water, so as to be very easily but positively rolled by the valve propelling means to be later described, or an equivalent actuating means, along the well spaced parallel tracks 65 at bottom, so spaced in order that the top surfaces thereof will be on a decided slant, sufficient to tend to keep themselves well cleared of sand intrusions, and under the similar upper narrow confining tracks or cross-ribs 66, mounted across the opening of circular ring cap 67 but in such wise as to slightly clear the said ball-valve 64, said ring cap 67 being bolted at 68 to the shell 61, with gasket 69 usually interposed around the perimeter thereof, and with suitable chain holes provided as shown on cap 67, to enable easy lift by crane, when required, within the lined maintenance well 70, which extends up to a conveniently accessible elevation, or to surface of ground.

This is to enable ready access to the valve elements, for repair or inspection purposes, or removal if necessary, for ball resurfacing at long intervals.

It will be especially noted, however, that a valve of this general type has a tremendous expanse of total seating surface available for successive presentation to the valve seats, so as to take up the very slow wear encountered, and since a rolling ball which is substantially free to turn in any direction, and operated under a near approach to weight-balance, will always be found to very gradually shift around on its axis to successively new positions, without any special provision being otherwise made therefor, other than the periodic high velocity rushes of fluid normally encountered, such shift will be found to occur, thus eventually exposing the entire wearing surface to the gasket positions, as desired.

Hence its normal operating life, between resurfacing or grinding periods, should be very great indeed, and its total life practically unlimited.

Seated on the funnel shaped top of ring cap 67, is the heavy hollow metal ball-valve 71, constructed more or less similarly to ball 64, but smaller and non-floated.

This smaller ball contacts with the heavy solid rubber ring gasket 72, which compresses enough for sealing purposes, and then allows the ball 71 to contact metal-to-metal with ring 67, from which the ball will ordinarily never be lifted, except momentarily under water-hammer conditions, after which it will promptly reclose, as the supporting funnel-shaped opening is so contoured that the ball can not lodge to one side thereof.

Well 70 may be kept drained normally by pumpage or otherwise, through drain pipe 73, although it might be allowed to partially fill, if preferred.

Closely fitting the main ball curvature of valve 64, are the hollow and substantially floated metal caps 74, 75, made with well rounded outer edges, so as to never score up the surface of ball, and fitted so as to give a slight amount of free swivel upon the ends of the respective hollow and substantially floated plungers 76, 77, which are appropriately guided by the lignum-vitæ or otherwise lined metal guide bushings 78, 79, in turn carried by the plurality of thin wing-vanes 80, 81, attached to the shells 82, 83, respectively, which are in turn bolted to the in-coming and out-going bends 84, 85, on which are mounted the long hydraulic cylinders 86, 87, provided with bolted heads 88, 89, through which enter the pressure pipes 90 and 91, respectively, from the usual "in" and "out" flow control valves (not shown).

For occasional blow-off of sand accumulations, or for drainage purposes, as and when required, I have provided the outlet 92, which taps the bottom of valve shell 61, and proceeds therefrom to an appropriate valve, and drainage path (not shown).

Note that at mid-point position of ball 64, said ball, taken together with the caps 74, 75, and the shell 61, are so proportioned as to develop a fully stream-line flow passageway through the valve as a whole, with but very easy deviations from a straight line path, or around bends of considerable radius, only, and with a substantially constant cross-section maintained throughout, as measured at successive positions transverse to the course of flow.

The figure shown may not precisely meet all these requirements, but in an actual design it may be very slightly modified so as to do so, by minor alterations of form.

At the end of each swing of the controlled water-column, as the valve closes, the ball 64 will move over until it somewhat restricts the passageway areas, but this movement will be carried out as quickly as possible, and the water velocities will at that time be very low indeed, so that such restriction will not incur much loss.

Note also that this ball 64 is preferably so left that the head behind it tends to keep the valve closed, and seal it tightly, after each swing of said water-column.

This type of valve has great simplicity and sturdiness, with probable extreme length of operative life, its one great drawback being the very considerable total pressure required momentarily to open it, after closure has been once attained.

This requirement may be successfully met by the successive use of the high-pressure hydraulic cylinders 86, 87, but nevertheless, in Figure 2, I have attempted to show an alternative construction, having many good features in common with the embodiment shown in Figure 1, but with this opening difficulty substantially absent, although at the expense of considerable complication of the valve structure as a whole, and an increase in its total bulk and cost.

In this Figure 2, the ball 64, although freely rotatable, is held substantially stationary in space, so far as any longitudinal motions are concerned, being provided with just a minute amount of freedom between the stationary hollow caps 74, 75, carried by the likewise stationary shafts 76', 77', which have enlarged screw-threaded portions 93, 94, terminating in the adjusting squares 95, 96, provided with the lock-nuts 97, 98, and threading into the projecting bosses 99, 100, designed on the inside to interfere as little as possible with the fluid flows within the hydraulic bends 84', 85', wherein said shafts 76', 77' are supported by the guide-bushings 78', 79', carried by the radial wings 80', 81', mounted integrally with the flanged cylindrical sections 101, 102, bolted between the respective bends 84', 85', and the respective ends of valve-shell 61'.

Sliding easily between the finished outside surfaces of cylinders 101 and 102, and the similarly machined inner surfaces of the reduced diameter portions 103, 104, of valve-shell 61', are the piston elements 105, 106, respectively gasketed to both inner and outer sliding surfaces by the gasket rings 107, 108, and 109, 110, all preferably of the multiple ring type, said pistons 105, 106 being connected together through the enlarged hollow buoyancy chamber 111, designed to just about float the entire moving element, and whose interior forms the more or less spherical valve-body 112, designed to give very close to stream-line flow conditions when the ball-valve 64 is at about mid-point thereof, and which is suitably provided with single or multiple solid-rubber gasket rings 113, 114, recessed properly within the finished valve seats located at these points, but readily pulled therefrom when required for turning over, or for replacement purposes, while the exterior shell 115 is made to clear by a material amount the enlarged central portion of the main valve-shell 61', before mentioned.

A pressure pipe 116, leading from the upper canal lock level, or some similar convenient source of water under pressure, connects to the 4-way control valve 117, while the opposite port thereon connects through pipe 118 to a sump or waste, the respective ports 90 degrees each way therefrom leading through tubes 119 and 120 to the interior of cylinders 103, 104, at the extreme ends thereof.

Throwing control valve handle 121 to its R or its L positions, will cause pistons 105, 106 to move over together to the right, or to the left, respectively, appropriately altering the main valve positions, while on turning the said control handle to S, the movement is brought to a stop, as and when desired.

It will be especially noted that the gaskets 113, 114 seat on the ball-valve 64 at points very close to the inside diameter of pistons 105 and 106, respectively, so that very little pressure is required to move the latter, even when valve is closed and under full operating pressure against the ball 64.

These control-valve operations may be readily made automatic, so far as the closure of main valve by the ball 64 at precise end of swing of the water column passing therethrough is concerned, by means shown in my co-pending valve application before referred to, and which therefore need not be repeated here, although equally applicable to the present types of valve, with only evident changes.

In every case all control equipment should be placed under lock and key, to obviate tampering therewith by unauthorized parties.

In the operation of the valves of my invention, it is believed that the provision made for rotation of the ball-valve elements, and their consequent slow and gradual shifting to present all portions of their surfaces to the valving action eventually, is very important in valves of the tremendous sizes contemplated herein, which may be subject to a great many functioning movements per diem, and in which it is essential to cut down the possible wear to a minimum, and increase the life of the valve to the utmost attainable.

My provisions to substantially eliminate all possibilities of galling up the working surfaces, are of almost equal importance here, and the attainment of an ultra-low "loss-of-head due to friction" is likewise of great advantage for the intended use. Thus it will be observed that certain very definite advantages accrue from the substantially straight-line flow and stream-line path of the working fluid, of substantially constant cross-section throughout, when at full "open" position of the valve, the nearly full floating-balance of the valve elements, the minimization of friction and wear, the rotation of the ball, and the simple means provided for two-way protection from water-hammer.

The simplicity and sturdiness of my preferred construction is also self-evident, and its ability to hold itself closed indefinitely, under its own pressure, and independently of the maintenance of pressure on the operating means, may sometimes be of considerable value. My constructions contemplate control of flows in either direction, successively, but are equally adaptable to mono-directional flow, if and as required.

I claim:

1. In a double-acting fluid control valve, a horizontally and progressionally rotatable hollow ball valve element, of the nearly floated type, a stationary enclosing shell providing therebetween at the full "open" position of valve a substantially stream-line and nearly straight-line passageway for the operative fluid, said passageway being of substantially constant cross section throughout, two ring type seating gaskets, one located on each side of the said shell considered longitudinally thereof, and a power means operative to close said valve alternately on each of said two gaskets, under continuous velocity control.

2. In a two direction fluid flow valve, a ball valve element advanceable by progressional rotation, substantially self-cleaning tracks positioned to guide said valve element during the rotation thereof, a stationary enclosing shell, substantially stream-line and constant cross section passageways formed between said element and said shell at near full "open" positions of said valve, two ring gaskets of elastic material, spaced longitudinally along axis of said valve but located substantially transverse thereto, around and mounted in said shell, and a power propelling means applied to longitudinally advance said ball valve element relatively to said shell, under continuous velocity and position control, between said gaskets and to each thereof in succession, as required.

3. In a two-way flow valve, a ball valve element, substantially self-cleaning tracks guiding the progression of said valve element, two ring gaskets spaced in the direction of said progression, an enclosing shell mounting said tracks and said gaskets, and power progressing means applied to rotationally advance said ball valve element between, and relatively to, said gaskets in succession.

4. In a two-way flow valve, a valve element, guides applied to determine the line of advance of said valve element, two ring gaskets positioned in planes transverse to the said line of advance and spaced therealong, an enclosing shell mounting said guides and said gaskets, an automatic water-hammer protective means mounted on said shell between said gaskets, said means including re-set elements also operative automatically, and a power propelling means applied to said shell and operative to advance said valve element relatively to and from said gaskets in succession, when and as required.

5. In a fluid control valve, a ball valve element, a co-operating and enclosing valve element, at least one ring gasket mounted on said enclosing valve element substantially transverse to the general line of flow of working fluid therethrough and so as to substantially surround the said fluid, a plurality of guides to direct the relative motion of said ball valve element within said enclosing element and toward said gasket, and a power closing means applied to produce relative motion of rotation and advance concomitantly by and between said ball element and said enclosing element and thereby rotationally advance the former relatively along said guides and toward the said gasket mounted on the latter element.

6. In a two-way-flow valve, a ball valve element, two gasket rings spaced in the direction of advance of said element but positioned in planes transverse to said direction, guides applied to determine the said direction of advance, an enclosing shell providing a substantially constant-cross sectional path between itself and said valve element at full "open" position of said valve, said shell mounting said gasket rings and said guides, a self-resetting type water-hammer relief means mounted in said shell between said gasket rings and applicable to relief of said valve for either direction of fluid flow therethrough, and a power propelling means mounted for motion longitudinally of said shell and applicable to advance said valve element relatively to said shell as and when required and in either direction.

7. In a two-way-flow fluid control valve, a nearly floated ball valve element, means for guiding the line of advance of said element, gasket rings mounted in spaced relation and transverse to said line of advance, said rings being positioned for sealing contact with said element at either end of its line of travel, respectively, an enclosing shell mounting said means and said rings, a ball type water-hammer relief valve element mounted upon said shell between said gasket ring positions, but outside of the line of advance of said ball element first mentioned, an elastic gasket ring mounted upon said shell and under said relief valve element, and guiding means determining the return of said element last mentioned to its proper re-seating position after functioning thereof, during either direction of fluid flow through said valve.

8. In a two-way-flow fluid control valve, a nearly floated ball valve element, guide means determining the line of advance of said element, gasket rings mounted in spaced relation along said line but positioned in planes transverse thereto, an enclosing shell mounting said guide means and said rings, and providing a substantially stream-line-flow passageway between itself and said element at near mid-throw position of latter, power propelling means applicable to rotationally advance said element between and relatively to said rings in either direction as required, and including means to positively hold said element at its near mid-point position, and to "dampen" the motion just at the closing positions, as required.

9. In a two-way fluid-flow control valve, a nearly floated ball valve element, guide means determining the line of advance of said element, gasket rings mounted for contact therewith at each end of said advance, respectively, an enclosing shell, power propelling means applicable to rotationally advance said element in either direction as required, caps mounted on said power means to contact with said element, said caps in conjunction with said shell and said element providing a substantially stream-line flow passageway therebetween at near mid-position of said advance.

10. In a two-way flow valve, two co-operating valve elements one of which encloses the other substantially, guides applied to one of said elements to determine the path of relative motion of the other valve element, two transversely positioned ring gaskets mounted in spaced relation along the axis of said relative motion and upon said one element, and a power closing means applicable to close said valve by the relative motion of said two valve elements, and at either one of the two gasket positions, as desired.

JAMES L. ADAMS, Jr.